May 24, 1960  J. K. PEASE  2,938,107
SERIES ARC WELDING CIRCUIT
Filed Jan. 13, 1958
FIG. I
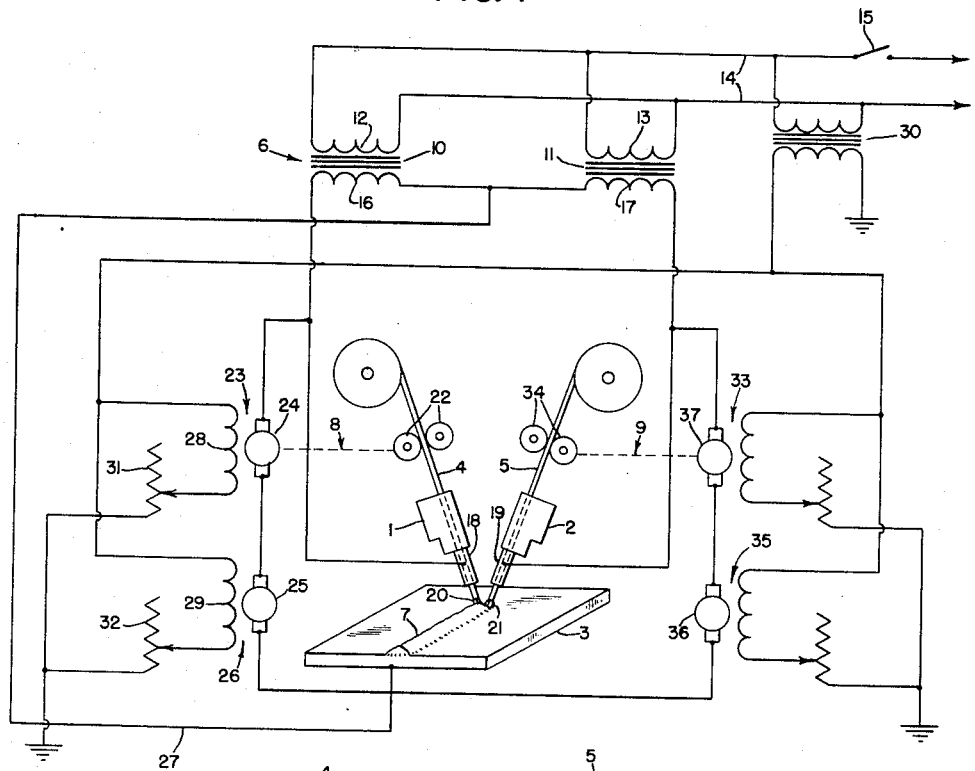
FIG. 2
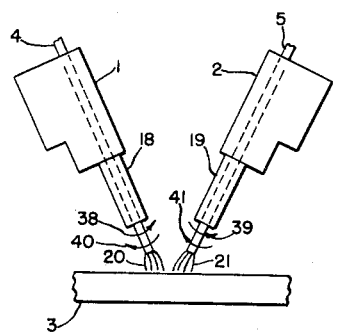
*INVENTOR.*
JAMES K. PEASE
BY
Andrus & Starke
Attorneys

United States Patent Office 2,938,107
Patented May 24, 1960

2,938,107
SERIES ARC WELDING CIRCUIT

James K. Pease, Milwaukee, Wis., assignor to A. O. Smith Corporation, Milwaukee, Wis., a corporation of New York Filed Jan. 13, 1958, Ser. No. 708,473

5 Claims. (Cl. 219—131)

This invention relates to a series arc welding circuit employing series connected electrodes and particularly to a consumable electrode feed control adapted to maintain each electrode a predetermined distance from the base workpiece.

In series arc welding circuits, a pair of consumable electrodes are connected respectively to the opposite terminals of a welding current source, such as the secondary of a welding transformer. The electrodes are positioned with respect to each other and with respect to a work member such that an arc is established between the electrodes and the work to continuously burn back or melt the electrodes and deposit them upon the work member. The work member is preheated by the arcs to establish a firm bond between the deposited metal and the base metal. It is important that the electrodes be maintained in precise spaced relation to the work member in order to maintain an accurate depositing of the metal and a predetermined heating of the work member.

It has been suggested that the arc voltage between the electrode and the base member be employed to regulate a variable consumable-electrode feed mechanism to maintain a predetermined arc length. This is the conventional manner of variably feeding a consumable electrode in a single electrode arc welding circuit.

Although this provides a satisfactory welding circuit for laboratory-type work, the adjustment and sensitivity of the feed control circuit is such that it is not practical for a production apparatus. The two weld head controls do not stay in balance and the arcs between the electrodes and the work become broken. This results in defective welds.

The present invention provides a simple and reliable circuit for the maintaining of balanced arc lengths which maintains the power consumed by each electrode substantially in balance independently of each other without any critical adjustments within the circuit.

In accordance with the present invention, the base member with which each electrode forms an arc is connected to an intermediate point of the welding source. If the power to be absorbed by each arc is substantially equal, the current connection is to a mid-point of the welding source such that the current in the neutral wire is normally zero. The electrode feed controls for each electrode are connected between the neutral or intermediate wire and the terminal connected to the respective electrode. If any factor causes the power consumed by the respective arcs to go out of balance, even for the very shortest duration, the neutral wire carries the out-of-balance current to whichever side of the power source is connected across the unbalanced arc. Therefore, only this electrode control head is affected and it rapidly changes the arc length of the corresponding arc to re-establish the desired balance.

An object of the present invention is to provide a stable series arc circuit employing variable electrode feeds to maintain a predetermined arc length between the consumable electrodes and the base member.

The drawing furnished herewith illustrates the best mode presently contemplated by the inventor for carrying out the invention.

In the drawings:

Figure 1 is a schematic circuit with certain components shown more or less diagrammatically for purposes of clarity; and Figure 2 is an enlarged fragmentary view illustrating relative position of the arcs.

Referring to the drawing, a pair of weld heads 1 and 2 are supported adjacent a workpiece 3 and are adapted to continuously direct a pair of consumable metal electrodes 4 and 5 towards the workpiece. The electrodes 4 and 5 are connected to an alternating current power source, not shown, by an arc welding transformer assembly 6 and are progressively melted and deposited upon the workpiece to form a layer 7 of weld metal. The electrodes 4 and 5 are separately driven by individual feed means 8 and 9 at a varying rate to maintain a constant distance between the tip of the corresponding electrode and the workpiece.

The transformer assembly 6 is adapted to change the incoming power supply to a voltage suitable for welding and comprises a pair of similar welding transformers 10 and 11 having the corresponding primary windings 12 and 13 connected in parallel to a pair of incoming leads 14 connected to the power supply. A manually controlled switch 15 is connected in either of the leads 14 to selectively connect the power supply to the welding circuit. Secondary windings 16 and 17 of respective transformers 10 and 11 are connected in series with each other to provide the necessary power to melt the electrodes 4 and 5. Tubular contact members 18 and 19 are located one in each of the respective welding heads 1 and 2 and are connected one each to each of the end terminals of the series-connected secondaries 16 and 17. The electrodes 4 and 5 pass through the respective members 18 and 19 to supply current to the electrodes 4 and 5.

When the welding circuit is completed, arcs 20 and 21 are established one each between each of the electrodes 4 and 5 and the workpiece 3 by the power supplied from the welding transformer secondaries 16 and 17. The current flows, during the one-half cycle of current input from electrode 4, through arc 20 to the workpiece 3 and then through arc 21 to the electrode 5. During the opposite half cycle, the current flow is in the opposite direction from the electrode 5 through arc 21 and then arc 20 to electrode 4. The arcs 20 and 21 raise the temperature of the tips of the electrodes 4 and 5 to a level which rapidly and continuously melts the ends of the electrodes and deposits the molten metal upon the workpiece 3 which is also heated by the arcs to receive and bond with the deposited metal.

The electrode feed means 8 is adapted to feed the electrode 4 to the arc 20 in accordance with the rate of melting of the electrode 4, and includes a pair of feed rolls 22 rotatably mounted on spaced shafts and in side-by-side relation with the peripheral surfaces disposed in engagement with the electrode 4. The feed rolls 22 are variably driven by a motor 23 or any other suitable mechanism which may be made responsive to the arc voltage. The schematically illustrated motor 23 includes an armature 24 which is coupled to the one shaft of the feed rolls 22 and which is electrically, serially connected with a generator armature 25 of a generator 26. The series-connected armatures 24 and 25 are connected at opposite ends of the series connection to the electrode 4 and to a neutral lead 27 connected between the junction of the secondary windings 16 and 17 and the work 3. The motor 23 and generator 26 each include a separate field winding 28 and 29 connected to a suitable source of exciting current, shown as a suitable step-down transformer 30 connected to the incoming power lines 14. Rheostats 31 and 32 are connected in series with windings 28 and 29 respectively to establish a predetermined output speed of the motor 23 incident to a normal arc length and voltage.

The net energization of the armature 24 of motor 23 is dependent upon the sum of the arc voltage and the generator output voltage. Therefore, as the arc voltage varies, the energization of the motor 23 varies accordingly and adjusts the drive of the electrode in such a direction as to substantially maintain its predetermined length, as follows.

When the arcs 20 and 21 are struck, the control circuit through the armature 24 of the motor 23 is completed therethrough.

The generator 26 establishes a current which energizes the motor armature 24 to bias the motor armature to rotate in one direction. The voltage across the arc 20 which is also connected in the control circuit of the motor 23 establishes a current which opposes the generator current and thereby tends to reverse the direction of rotation of the motor armature 24. The circuit components are selected such that the generator current is normally less than the arc-voltage current and such that the current resulting from the arc voltage energizes the motor 23 to feed the electrode in the forward direction.

Therefore, an increased arc voltage arising from an increased arc length subtracts from the generator voltage and raises the net energizing voltage across the motor armature 24. The speed of armature 24 and the coupled feed rolls 22 increase accordingly and the rate of feed of electrode 4 increases until the normal arc length and the corresponding arc voltage is again established.

Similarly, a decreased arc voltage, arising from a decreased arc length, decreases the net energizing voltage across the motor armature 24. The electrode feed is correspondingly reduced until the arc length returns to normal.

The feed mechanism 9 is similar to the feed mechanism 8 and includes a drive motor 33 coupled to a pair of feed rolls 34 to continuously feed the electrode 5 to the workpiece 3. A generator 35 includes an armature 36 connected in series with an armature 37 of motor 33. The series connected armatures 36 and 37 are connected at opposite ends to the electrode 5 and the workpiece 3 through the neutral lead 27. The feed mechanism 9 responds to the variation of the voltage of arc 21 in a manner similar to the response of mechanism 8 to the arc 20.

The operation of the series arc circuit is as follows:

The main control switch 15 is closed to supply power to transformers 10 and 11 which in turn furnish power of a suitable voltage to the electrodes 4 and 5 for establishment of arcs 20 and 21. The electrodes 4 and 5 are initially disposed in touching spaced relation to the workpiece 3. Thus, when the power supply is first connected, a short circuit condition exists across the secondary windings 16 and 17 and a large surge of current flows through the touching electrodes 4 and 5. The large current rapidly burns back the electrodes 4 and 5 and establishes the arcs 20 and 21. As the arcs 20 and 21 are established, the voltage thereacross rises and the current correspondingly reduces due to the characteristic of the transformers until a balance is reached to sustain arcs of a predetermined length. The electrodes 4 and 5 are continuously driven to the corresponding arcs 20 and 21 at a rate dependent upon the arc voltage to maintain the predetermined arc length.

As shown in the enlarged fragmentary view, Fig. 2 of the drawing, the arcs 20 and 21 are entirely separate arcs existing one each between each of the electrodes 4 and 5 and the workpiece 3. The separate arcs 20 and 21 result from the magnetic effect of the current in the respective electrodes. Thus, with the current flow from electrode 4 to electrode 5, magnetic fields are established in a clockwise direction about each of the electrodes as diagrammatically illustrated by the lines 38 and 39 and in a counterclockwise direction as diagrammatically illustrated by the lines 40 and 41 when the current reverses. The magnetic fields oppose each other and bias the electrodes 4 and 5 and the corresponding arcs 20 and 21 from each other. The arcs 20 and 21 which are relatively free to move are thus maintained in spaced relation to each other by the magnetic fields.

The normal current flow is then through the series circuit, as previously described which includes the secondary windings 10 ant 11, the electrodes 4 and 5, the workpiece 3 and the arcs 20 and 21. If the arcs 20 and 21 absorb a power value corresponding to the output of the corresponding transformer 10 and 11, the arcs are in balance.

If the arcs 20 and 21 are in balance, the arc voltage across each arc remains constant and the corresponding electrodes 4 and 5 are driven at a constant speed to the arcs to maintain them. If the length of either of the arcs 20 or 21 varies because of an electrical variation in line voltage or the like or because of some physical variation such as a disconformity in the base member, the power absorbed by the the arcs may vary and an unbalance of power occur with one of the arcs drawing increased current. Normally, the current change due to the variation in one arc effects the voltage across each arc because the arcs 20 and 21 are in series circuit and the same current flows through both. An unbalance current in the present circuit, however, is carried by the neutral wire 27 back to the secondary winding 16 or 17 of transformer 10 or 11 which is directly associated with the unbalanced arc. The output of this transformer is therefore changed and the voltage which appears across the motor driving the corresponding electrode changes accordingly. The motor then changes its speed to increase or decrease the rate of electrode feed to return the affected arc to the normal arc length and maintains the speed change until the arc length returns to normal and normal arc voltage again energizes the motor.

For example, assume that a raised portion, not shown, in the workpiece 3 is encountered by the electrode 4 which causes the distance between the surface of workpiece 3 and the tip of electrode 4 to decrease. The voltage therebetween and across the arc decreased in proportion to the decreased separating distance. This decreased voltage decreases the net voltage energizing the motor armature 24 and reduces the speed of the motor rotation. The feed rolls 22 are then driven at a reduced rate and the electrode 4 effectively withdrawn from the workpiece 3 and the arc length increases. The arc voltage then increases and the speed of the motor returns to normal incident to normal arc length and voltage across arc 18.

The circuit similarly functions if a depression, not shown, in the workpiece 3 is encountered by the electrode 4 to increase the arc length to normal.

The feed mechanism 9 works in the same manner as feed mechanism 8.

Although, some hunting occurs due to inertia in the motor and associated feed mechanism, very stable series arcs 20 and 21 result from variable feed systems connected in accordance with the present invention.

Although, the transformer assembly 6 is shown including two separate transformers, a single transformer with an intermediately tapped secondary, or with an intermediately tapped high impedance in parallel with the secondaries can be employed. Further, the transformer assembly can also be replaced with any other suitable source of welding current adapted to be intermediately tapped.

If one arc is to absorb more power than the other, the neutral connection can be set off-center of the total output of the source. The operation of the circuit will be the same except one arc will continuously absorb more power.

The present invention provides a simple and reliable circuit for maintaining a stable arc or arcs in series arc welding wherein consumable electrodes are continuously and variably driven to the work.

Various modes of carrying out the invention are contemplated as being within the scope of the following claims particularly pointing out and distinctly claiming the subject matter which is regarded as the invention.

I claim:

1. In a welding circuit for series arc welding having at least a pair of series arcs maintained one each between each of a pair of adjacent consummable electrodes and a workpiece to continuously deposit the electrodes upon the workpiece, a source of current suitable for arc welding including a pair of terminals adapted to be connected one each to each electrode and including a third terminal intermediate said pair of terminals adapted to be connected to said workpiece, and a pair of electrode feed means individually connected one each between the intermediately located terminal and said pair of terminals and responsive to the voltage variation between the corresponding electrode and the workpiece to vary the feed of the corresponding electrode.

2. In a power source for a series arc welding circuit maintaining a pair of series arcs one each between each of a pair of adjacent consummable electrodes and a metallic base member to deposit the electrodes upon the base member, a transformer means having end terminals and a center terminal, said end terminals each being adapted to be connected to a consummable electrode and said center tap being adapted to be connected to the base member, first voltage sensitive electrode feed means operatively coupled with a first of said consummable electrodes and electrically connected between the first electrode and the base member to vary the first electrode-feed-rate in accordance with the arc voltage between the first electrode and base member and thereby maintain a predetermined arc length, and a second voltage sensitive electrode feed means operatively coupled with the second of said consummable electrodes and electrically connected between the second electrode and the base member to vary the second electrode-feed-rate in accordance with the arc voltage between the second electrode and the base member and thereby maintain a predetermined second arc length.

3. In a power source for series arc welding having series arcs maintained one each between each of a pair of adjacent consummable electrodes and a metallic base plate to deposit the electrodes upon the base plate, transformer means having secondary winding means adapted to be connected at opposite ends to said electrodes, means connecting the secondary winding means and the base plate to establish the base plate at a potential intermediate the potential between said electrodes, voltage-sensitive electrode-feed means operatively engaging a first of the electrodes and connected to the base plate and the associated electrode to vary the rate of feed of the electrode in response to variations in arc voltage between the electrode and the base plate to maintain a substantially constant arc length therebetween, and second voltage-sensitive electrode-feed means operatively engaging the second of the electrodes and connected to the base plate and the second electrode to vary the rate of electrode feed in response to variations in arc voltage between the second electrode and the base plate to maintain a substantially constant arc length therebetween.

4. In a power source for series arc welding wherein series arcs are maintained one each between each of a pair of adjacent consummable electrodes and a metallic base plate to deposit the electrodes upon a surface of the base plate, a pair of arc welding transformers having the secondary windings connected in series circuit with the electrodes connected one to each end of the series circuit, a common lead connected to the junction of said secondary windings and said base plate, first voltage-responsive electrode feed control means operably associated with one of said electrodes to feed the electrode to the arc and connected to the associated electrode and the common lead to vary the rate of feed in accordance with the corresponding arc voltage, and second voltage-responsive electrode feed control means operably associated with the other of said electrodes to feed the electrodes to the arc and connected to the associated electrode and the common lead to vary the rate of feed of the second electrode in accordance with the corresponding arc voltage.

5. In a power source for series arc welding wherein series arcs are maintained one each between each of a pair of adjacent consummable electrodes and a metallic base plate to deposit the electrodes upon a base metal, a pair of identical arc welding transformers having the secondary windings connected in series circuit with the electrodes connected one to each end terminal, a common lead connected to the junction of said secondary windings and said base plate, a first voltage-responsive electrode feed control operably associated with one of said electrodes to feed the electrode to the arc and connected to the associated electrode and the common lead to vary the rate of feed in accordance with the corresponding arc voltage, and a second voltage-responsive electrode feed control operably associated with the other of said electrodes to feed the electrodes to the arc and connected to the associated electrode and the common lead to vary the rate of feed of the second electrode in accordance with the corresponding arc voltage.

References Cited in the file of this patent

UNITED STATES PATENTS

| 2,479,087 | Steward | Aug. 16, 1949 |
| 2,527,336 | Schaefer | Oct. 24, 1950 |
| 2,669,640 | Outcalt et al. | Feb. 16, 1954 |

FOREIGN PATENTS

| 554,687 | Great Britain | July 15, 1943 |